US007558637B2

(12) United States Patent
Takemura et al.

(10) Patent No.: US 7,558,637 B2
(45) Date of Patent: Jul. 7, 2009

(54) DIGITAL MIXER CAPABLE OF PROGRAMMING MIXER CONFIGURATION, MIXER CONFIGURATION EDITING APPARATUS, AND CONTROL APPLICATION PROGRAM TO CONTROL DIGITAL MIXER

(75) Inventors: Satoshi Takemura, Hamamatsu (JP); Yoshinori Kawase, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 610 days.

(21) Appl. No.: 11/180,963

(22) Filed: Jul. 12, 2005

(65) Prior Publication Data

US 2006/0015200 A1 Jan. 19, 2006

(30) Foreign Application Priority Data

Jul. 13, 2004 (JP) ............................ 2004-205902

(51) Int. Cl.
*G06F 17/00* (2006.01)
*H04B 1/00* (2006.01)
*H04B 1/20* (2006.01)

(52) U.S. Cl. ............................ 700/94; 381/119; 369/4

(58) Field of Classification Search .................. 700/94; 381/119; 369/4
See application file for complete search history.

(56) References Cited

U.S. PATENT DOCUMENTS

2002/0193894 A1* 12/2002 Terada et al. .................. 700/94
2003/0059066 A1* 3/2003 Kohyama et al. ........... 381/119
2003/0086580 A1* 5/2003 Hamamatsu ................ 381/119
2004/0073419 A1* 4/2004 Aoki et al. .................. 704/201

OTHER PUBLICATIONS

Yamaha Digital Mixing Engine DME32, Owner's Manual, Yamaha Corporation, Japan.

* cited by examiner

*Primary Examiner*—Curtis Kuntz
*Assistant Examiner*—Andrew C Flanders
(74) *Attorney, Agent, or Firm*—Morrison & Foerster LLP

(57) ABSTRACT

A digital mixer has a processor capable of operating in accordance with a program to constitute a sound signal processing module and executing a program corresponding to mixer configuration data defining a mixer configuration of the sound signal processing module to perform a sound signal processing operation of the mixer configuration. In the digital mixer, a current memory stores an operation data set having a data structure corresponding to the mixer configuration data. A control section controls the sound signal processing operation of the sound signal processing module based on the operation data set stored in the current memory. A storage is provided for storing a plurality of operation data sets and attribute information indicative of data structures of the respective operation data sets. A select section selects one of the operation data sets stored in the storage. A converting section converts the selected operation data set from the data structure indicated by the attribute information of the selected operation data set into a data structure corresponding to the mixer configuration data, and recalls the converted operation data set to the current memory.

18 Claims, 12 Drawing Sheets

SINGLE VALUE

ONE-DIMENSIONAL ARRAY

IN CASE WRITE DESTINATION AREA IS LARGER THAN WRITE ORIGIN

TWO-DIMENSIONAL ARRAY

DATA TO BE WRITTEN 921

| | | |
|---|---|---|
| E[1][1]x | E[1][2]x | E[1][3]x |
| E[2][1]x | E[2][2]x | E[2][3]x |
| E[3][1]x | E[3][2]x | E[3][3]x |
| E[4][1]x | E[4][2]x | E[4][3]x |

WRITE DESTINATION (BEFORE WRITING) 922

| | |
|---|---|
| E[1][1]o | E[1][2]o |
| E[2][1]o | E[2][2]o |
| E[3][1]o | E[3][2]o |
| E[4][1]o | E[4][2]o |
| E[5][1]o | E[5][2]o |
| E[6][1]o | E[6][2]o |

→

WRITE DESTINATION (AFTER WRITING) 923

| | |
|---|---|
| E[1][1]x | E[1][2]x |
| E[2][1]x | E[2][2]x |
| E[3][1]x | E[3][2]x |
| E[4][1]x | E[4][2]x |
| E[5][1]o | E[5][2]o |
| E[6][1]o | E[6][2]o |

IN CASE WRITE DESTINATION AREA IS SMALLER THAN WRITE ORIGIN

DATA TO BE WRITTEN | WRITE DESTINATION (BEFORE WRITING) | WRITE DESTINATION (AFTER WRITING)

DIGITAL MIXER CAPABLE OF PROGRAMMING MIXER CONFIGURATION, MIXER CONFIGURATION EDITING APPARATUS, AND CONTROL APPLICATION PROGRAM TO CONTROL DIGITAL MIXER

BACKGROUND OF THE INVENTION

1. Technical Field

The present invention relates to a digital mixer capable of programming the mixer configuration for sound signal processing, a mixer configuration editing apparatus, and a control application program to control the digital mixer.

2. Related Art

Conventionally, there is known the digital mixer capable of customizing the mixer configuration as described in non-patent document DIGITAL MIXING ENGINE DME32 Instruction Manual, YAMAHA CORPORATION, 2001. This digital mixer configures the sound signal processing module using a processor (e.g., digital signal processor (DSP)) that can operate on programs. In this manner, the sound signal processing is made available based on the mixer configuration (signal process configuration) that is created and edited through the use of an external PC (personal computer). A special-purpose mixer control program is used to create and edit the mixer configuration on the PC. That is, a user executes the mixer control program on the PC to display a mixer edit screen. The user arranges components as parts on the screen for signal processes. The user makes wire connections between the arranged components to define the input/output relationship. In this manner, the mixer configuration is created and edited. When the created mixer configuration is transferred to the digital mixer for execution, the digital mixer implements operations of the mixer configuration.

Such digital mixer makes it possible to use a plurality of scenes for each mixer configuration. Scene data is a data set of parameters used for operations according to the mixer configuration. Even though the same mixer configuration is used, the digital mixer may need to operate according to various parameter values. For this purpose, a plurality of scene data is provided and is called as needed to operate the mixer.

In related art, scene data is incidental to the mixer configuration. The scene data structure varies with mixer configurations. Therefore, there is no compatibility between scene data having different data structures corresponding to different mixer configurations. Unavailability of the compatibility causes inconvenience in various situations. For example, there may be a case of using the PC's mixer control program for minor change of the mixer configuration to slightly edit the mixer configuration currently active on the mixer engine and transferring the edited mixer configuration from the program to the mixer engine for operation. In this case, the edited mixer configuration cannot call scenes used for the mixer configuration before the minor change. When the mixer engine is available in various models, for example, the respective models generally use different scene data structures. It has been impossible to use different models' scenes for similar mixer configurations.

When the original mixer configuration is edited, it may be possible to appropriately modify the structure of scene data corresponding to the original mixer configuration so that the modified scene data can be used for the edited mixer configuration. However, it is difficult to modify the scene data structure. This is because there is unknown correspondence between scene data having different structures. That is, it is unknown which parameter in the scene data to be read as an origin should be written to which position in the scene data as a write destination. Further, the scene memory often contains many pieces of scene data. It is time-consuming to change all the scene data in accordance with the change in the mixer configuration.

SUMMARY OF THE INVENTION

The present invention has been made to solve the above-mentioned problems. Specifically, it is an object of the present invention to configure a sound signal processing module using a processor operable in accordance with a program and, under specified conditions, enable compatibility between parameter data sets having different data structures corresponding to different mixer configurations in a digital mixer which is capable of processing sound signals based on mixer configurations edited through the use of an external PC.

To achieve this object, the present invention provides the digital mixer that reads mixer configuration data defining a mixer configuration and an operation data set used for the mixer configuration data, and that performs a sound signal processes operation according to the operation data set. For each operation data set, the digital mixer stores attribute information indicative of a data structure of the operation data set. That is, a plurality of operation data sets held in the operation data set storage means may have different data structures. The attribute information is associated with and depends on the corresponding mixer configuration data working at the time of reserving the operation data.

Editing the mixer configuration data to be processed causes converting of the data structure of an operation data set to be processed in the current memory from the data structure corresponding to the mixer configuration data before the edit into the data structure corresponding to the mixer configuration data after the edit. When the mixer configuration data is edited, it is necessary to convert data structures of all operation data sets corresponding to the edited mixer configuration data. According to the present invention, however, each operation data set is provided with attribute information. The data structure can be converted later at the time when the operation data set is to be used. Even when the mixer configuration data is edited, it is not necessary at that time to convert data structures of all the operation data sets corresponding to the mixer configuration data.

There may be a case of recalling or loading an operation data set from the operation data set storage to the current memory. In such case, the present invention converts the data structure of the operation data set to be processed from the data structure indicated by the corresponding attribute information into the data structure corresponding to the mixer configuration to be processed. The converted operation data set is overwritten to the current memory.

Further, there may be a case of storing or saving an operation data set from the current memory into the operation data set storage. In such case, the present invention generates attribute information indicative of the data structure of the operation data set in the current memory based on the mixer configuration data currently working. The generated attribute information is provided to the operation data set and is written to the operation data set storage.

The present invention provides an operation data set needed to operate the digital mixer in the mixer configuration defined by the mixer configuration data. Each operation data set is provided with the attribute information indicative of the data structure of the operation data set. This improves the compatibility of operation data sets in various situations. The data structure of an operation data set depends on the corresponding mixer configuration that uses the operation data set.

As described above, there have been many cases where operation data sets become unavailable due to editing of the mixer configuration. Since the present invention provides an operation data set with the attribute information, the data structure of the operation data set can be readily converted when using the operation data set, thereby improving the compatibility of operation data sets.

Especially, the digital mixer according to the present invention allows the storage means to store the operation data sets having various data structures. There may be a case where a data structure of the operation data set may differ from the data structure corresponding to the mixer configuration used for the digital mixer's sound signal processing operation. In such case, the data structure of the operation data set stored in the storage means can be read into the current memory while converting data contents based on the corresponding attribute information. The sound signal processing module performs the sound signal processing operation according to the mixer configuration corresponding to the selected mixer configuration data. The current memory stores the particular operation data set for controlling the sound signal processing operation. The operation data set storage stores a plurality of operation data sets. Each of these operation data sets is provided with the attribute information indicative of the operation data set's data structure. Accordingly, the operation data set can be recalled into the current memory even though there is a difference between the data structure of the operation data set stored in the operation data set storage and the data structure of the operation data set held in the current memory.

With respect to the mixer configuration editing apparatus and the control application program according to the present invention, editing the selected mixer configuration data accordingly causes changes of the data structure of the operation data set stored in the current memory. The operation data set storage stores a plurality of operation data sets. Each of these operation data sets is provided with the attribute information indicative of the operation data set's data structure. Accordingly, the operation data set can be recalled into the current memory even though there is a difference between the data structure of the operation data set stored in the operation data set storage and the data structure held in the current memory. Further, it is possible to inherit the operation data set held in the current memory immediately before the mixer configuration data editing as an operation data set for the mixer configuration after the editing.

BRIEF DESCRIPTION OF THE DRAWINGS

FIGS. 5(*a*) through 5(*c*) are flowcharts showing processes of adding a new component and the like.

DETAILED DESCRIPTION OF THE INVENTION

An embodiment of the present invention will be described in further detail with reference to the accompanying drawings.

Figure 1:
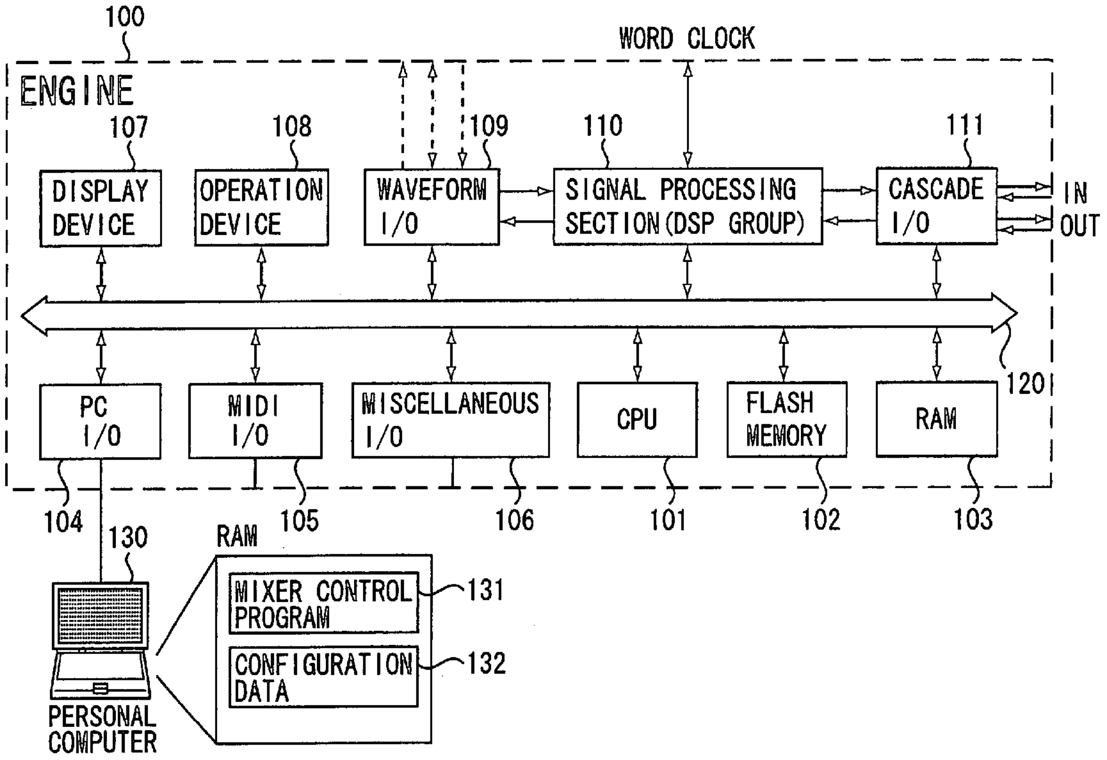
FIG. 1 is a configuration diagram showing a digital mixer engine as an embodiment of the present invention.

FIG. 1 shows the configuration of a digital mixer engine as an embodiment of the present invention. An engine 100 includes a central processing unit (CPU) 101, flash memory 102, RAM (random access memory) 103, a PC input/output interface (I/O) 104, a MIDI I/O 105 a miscellaneous I/O 106, a display device 107, a operation device 108, a waveform I/O 109, a signal processing section (DSP group) 110 a cascade I/O 111, and a system bus 120.

The central processing unit (CPU) 101 controls overall operations of the mixer. The flash memory 102 is nonvolatile memory that stores various programs and data used for DSPs in the signal processing section 110 and the like. The RAM 103 is volatile memory used as load areas and work areas for programs executed by the CPU 101. The PC I/O 104 provides interfaces (e.g., LAN, USB, and serial I/O) for connection with an external personal computer (hereafter referred to as a PC). The MIDI I/O 105 provides interfaces for connection with various MIDI devices. The miscellaneous I/O 106 provides interfaces for connection with the other devices. The display device 107 displays various types of information provided on the mixer's external panel. The external panel is provided with a variety of the operation devices 108 for a user to operate. The waveform I/O 109 provides an interface for interchanging sound signals with external devices and implements an A/D (analog-digital) conversion function, a digital signal input function, and a D/A (digital-analog) conversion function. The A/D conversion function incorporates an analog sound signal, converts it into a digital signal, and passes it to the signal processing section 110. The digital signal input function incorporates a digital sound signal and passes it to the signal processing section 110. The D/A conversion function converts the digital sound signal output from the signal processing section 110 into an analog sound signal and outputs it to a sound system. The signal processing section 110 comprises several DSPs (digital signal processors). Based on instructions from the CPU 101, the DSPs execute various microprograms to perform a mixing process, an effect provision process, a volume level control process, and the like for waveform signals input via the waveform I/O 109. The DSPs output the processed waveform signals via the waveform I/O 109. The cascade I/O 111 provides an interface for cascade connection with the other digital mixers. The cascade connection can increase the number of input/output channels and the DSP throughput.

The engine 100 of this digital mixer makes it possible to customize a mixer configuration to be implemented on the signal processing section 110. The mixer configuration can be created and edited on the screen of the PC 130 by means of a specified mixer control program 131 running on the PC 130. A collection of created mixer configurations is referred to as a configuration. In accordance with user's operations and instructions on the screen, the mixer control program 131 generates the configuration as configuration data 132 in the memory. The PC 130 can save the configuration data 132 as a file on any writable storage apparatuses. Each mixer configuration is contained in the configuration data stored in the storage apparatuses such as memory and a hard disk for the PC 130. When the mixer configuration is compiled (converted into information interpretable for the engine 100), it can be transferred to the engine 100. The engine 100 can store and save the configuration data transferred from the PC 130 in the flash memory 102. When the configuration data stored in the flash memory 102 contains mixer configurations, a specified operation can be performed to specify one of the mixer configurations to be current. The engine 100 operates based on the mixer configuration, implementing the mixer specified by the mixer configuration.

The mixer control program 131 is available in online mode and offline mode as operation modes. A specified operation can be used to switch between these modes. In the offline mode, only the PC 130 can be used to create and edit configuration data. In the offline mode, the mixer control program 131 on the PC 130 realtime controls the engine 100. When configuration data is loaded into the RAM of PC 130, specifying the online mode transfers the currently active configuration data to the engine 100 (after compilation). The transferred configuration data is stored in the flash memory 102. In this manner, the configuration data matches between the PC 130 and the engine 100. When the mixer configuration is specified to be current on the PC 130, this mixer configuration state (parameter settings and the like) is transmitted to the engine 100. In this manner, the PC 130 completely synchronizes with the engine 100 and becomes able to control the engine 100. For example, let us consider that a fader is provided to components displayed on the mixer configuration screen on the PC 130 or that a fader is provided to the control screen for a given component. When a mouse is used to operate that fader in the online mode, the operation is realtime reflected on the engine 100. The online mode disables the PC 103 to change the component configuration and wire connections. Making a change automatically enables the offline mode.

Not only an end user, but also an agency may belong to users who create and edit configuration data using the PC 130. When the mixer is installed in a hall, for example, an agency goes to the hall and connects the PC 130 to the mixer. Using the PC 130, the agency creates and edits configuration data for a mixer configuration suited to the hall and stores the configuration data in the flash memory 102. In this case, the mixer may be non-programmable (incapable of allowing an end user to create or edit mixer configurations and capable of only allowing him or her to call and use mixer configurations provided by the agency). Using the operation device 108 on the panel, the end user can read the mixer configuration for configuration data stored in the flash memory 102 and operate the mixer according to the mixer configuration. Therefore, the PC 130 need not be connected during operation. Of course, it is possible to connect the PC 130 in the online mode and control the mixer by operating the PC 130.

Figure 2A:
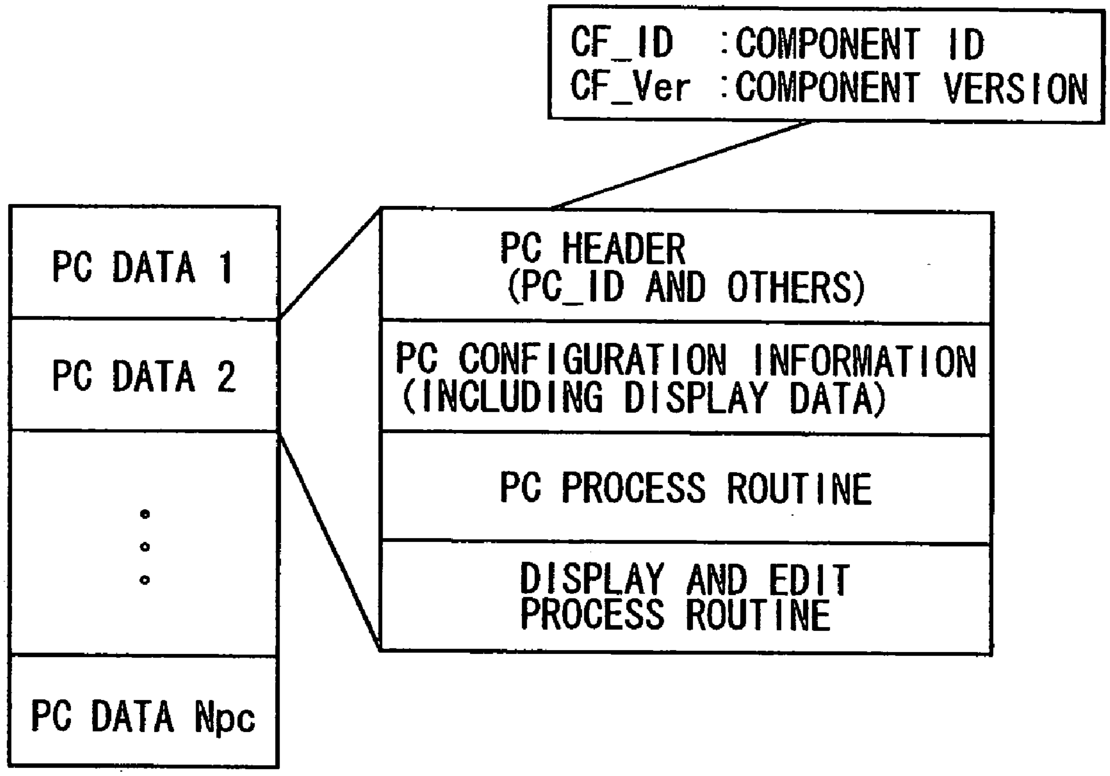
FIGS. 2(*a*) through 2(*c*) are a configuration diagram showing various data in a PC.
Figure 2C:
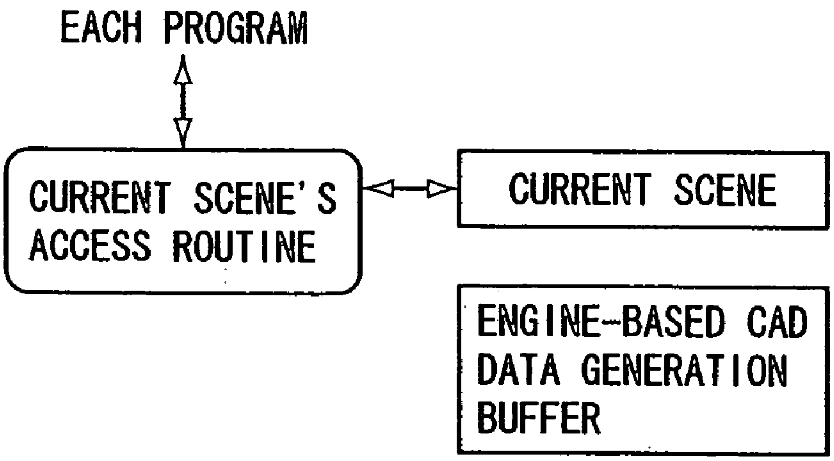
Figure 2B:
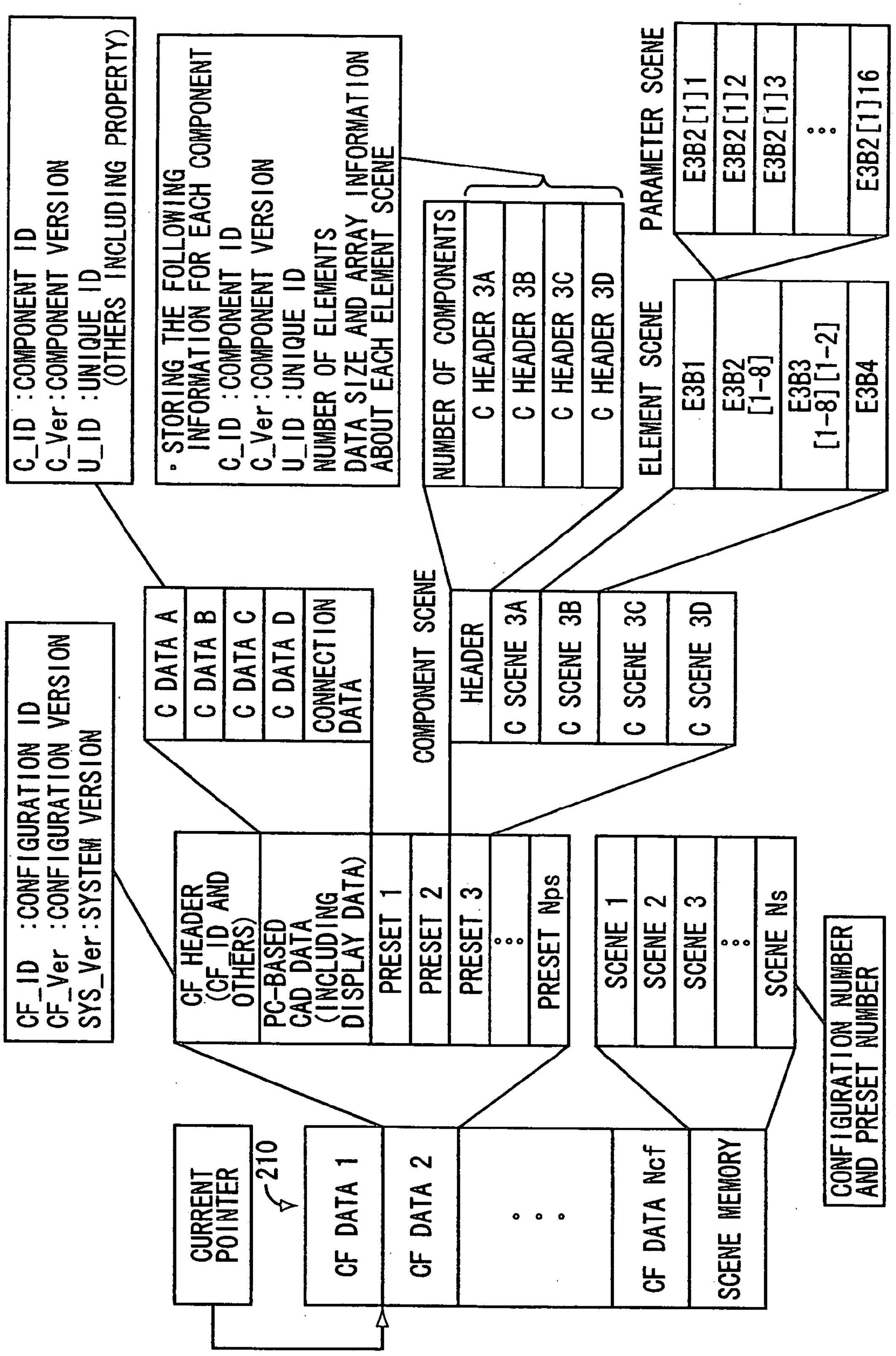

FIG. 2(*a*) shows the configuration of P (preset) component data (PC data) used for the mixer control program 131 on the PC 130. The P component (hereafter simply referred to as the component) is a block as a basic unit part for customizing the mixer configuration. For example, there are provided parts components including such audio processors as auto mixer, compressor, effect, and crossover and such individual parts as fader, switch, pan, and meter. When the mixer control program 131 is used to create and edit a mixer configuration, a specific procedure is to arrange components and connect lines between them on the mixer configuration screen of the PC 130. Connecting lines between the components is equivalent to define the signal input/output relationship between the components.

One piece of PC data in FIG. 2(*a*) is definition data to specify one component and is prestored in any storage means accessible from the mixer control program 131. The PC data is provided correspondingly to component types. It is assumed that there are Npc types of PC data. The whole of Npc PC data is provided with the component set version.

One piece of PC data is composed of a PC header, PC configuration information, PC process routine, and a display and edit process routine. The PC header is composed of a component ID (PC_ID) and a component version (PC_Ver). The use of PC_ID and PC_Ver can specify PC data. The PC configuration information provides information (including the order of elements) indicating which elements constitute the component. The PC configuration information includes display data such as a control display (to be described with reference to FIG. 4(*b*)) for the component. The element signifies a constituent equivalent to a part constituting the component. The PC configuration information further includes parameter item arrangement information for each element constituting the component. For example, the parameter item arrangement information includes array information, the data size per element, and the like. The array information represents which of data formats such as single value, one-dimensional array, and two-dimensional array is attributed to the element parameter. Namely, the parameter item arrangement information is a kind of attribute information indicative of a data structure of the operation data set. A plurality of operation data sets held in an operation data set storage may have different data structures. The attribute information is associated with and depends on the corresponding mixer configuration data. The PC process routine is a program to provide various processes concerning the PC configuration information. The mixer control program 131 processes the mixer configuration using the PC process routine for each component. The display and edit process routine provides a group of programs used to create and edit CF data.

FIG. 2(*b*) shows the structure of configuration data in the RAM processed by the mixer control program 131. Reference numeral 210 denotes configuration data loaded into the RAM. The configuration data is composed of a plurality of CF data 1 through Ncf and scene memory. The configuration data 210 as a whole can be stored as one file in a given storage apparatus (e.g., a hard disk in the PC). Reversely, the configuration data can be read from a given storage apparatus and can be loaded into the RAM of the PC 130 in the form as indicated by reference numeral 210. The CF data is provided with numerals 1 through Ncf called configuration numbers (CF numbers). The configuration number can be used to specify the CF data (or an area where the CF data is stored). A current pointer points to CF data to be processed. The CF data pointed by the current pointer is displayed in a mixer configuration screen to be described with reference to FIG. 4 (*a*). The CF data pointed by the current pointer is referred to as "current configuration".

One piece of CF data specifies one mixer configuration and is composed of a CF header, PC-based CAD data, and presets as many as Nps. The CF header is composed of a configuration ID (CF_ID), a configuration version (CF_Ver), and a system version (SYS_Ver). The use of CF_ID and CF_Ver can specify CF data. The PC-based CAD data defines how the mixer configuration for the CF data is configured by wiring which components. The PC-based CAD data is composed of C data and wire connection data. The C data specifies a component to be used as a constituent element of the mixer configuration. The wire connection data makes connection between components. The PC-based CAD data includes display data such as a mixer configuration screen to be described with reference to FIG. 4(*a*). The C data in the PC-based CAD data is composed of a component ID (C_ID) to specify the component, a component version (C_Ver), a unique ID (U_ID), and miscellaneous data (e.g., properties). The C data's C_ID and C_Ver specify a component by specifying PC_ID and PC_Ver for the PC data in FIG. 2(*a*).

The "miscellaneous data" in the C data includes variation information Vari about the PC data specified by the C data. As mentioned above, one piece of PC data represents a component equivalent to one part of the mixer configuration. For example, an automixer uses several variations in terms of the number of inputs and outputs. A fader uses several variations in terms of the number of channels. Even when C_ID and C_Ver specify PC data, the above-mentioned variation information needs to be specified so that the PC data's components can actually operate. The C data includes variation information Vari as well as C_ID and C_Ver. Accordingly, the PC data components specified by the C data can operate based on the variation information Vari. Some PC data may not need specification of the variation information. When specifying such PC data, The variation information Vari is unneeded in the "miscellaneous data" of the C data.

The following describes the unique ID (U_ID) in the C data. When the CF data's mixer configuration are sequentially edited, the same CF_ID is inherited. In this case, the U_ID specifies the C data in the series. For example, let us consider a case of initially creating new CF data. Each time C data is newly added (adding a component), the C data is supplied with a new U_ID value. When the C data is deleted, the U_ID value for that C data is reserved and is not used as U_ID in the series for the CF data. If there are reserved U_ID values, a new U_ID value is assigned to C data that is newly added thereafter. In this manner, CAD data in the CF data is edited. The C data is added or deleted. The CF data may be saved at a given point during the edit process. In such case, it is possible to determine that C data having matching U_ID values are the same in the series (a collection of CF data with the same CF_ID). The "same C data" here includes those having the same C_ID and C_Ver and different variation information Vari.

The following describes presets in the CF data. One piece of CF data includes any number of presets. These presets are collectively referred to as a library for the CF data. The presets are provided with numerals 1 through Nps called preset numbers. The preset number can be used to specify a preset (or an area where the preset is stored) in the CF data. The preset indicates set data of specific parameter values used for the mixer configuration of PC-based CAD data for the CF data containing that preset. As mentioned above, the PC-based CAD data specifies one mixer configuration. Specified parameters need to be set for each component so as to actually operate the digital mixer based on the specified mixer configuration. It is necessary to specify parameter values such as input and output levels for an automixer or the level for a fader, for example. The preset provides a data set of parameter values used for each component to actually operate.

One preset is composed of a header and any number of C (component) scenes. A portion of C scenes in the preset is referred to as a parameter data set. The order in a list of C scenes for the parameter data set corresponds to that in a list of C data in the PC-based CAD data. In FIG. 2, C scene 3A represents the parameter of a component specified by C data A, C scene 3B represents the parameter of a component specified by C data B, and so on. One C scene is composed of a list of element scenes. Each component is composed of several elements. Each of the element scenes constituting the C scene represents a parameter set specified for each of elements constituting the component. A list of element scenes is specified by the PC configuration information about the component (PC data in FIG. 2(*a*)). For example, C scene 3B in the preset for CF data 2 in FIG. 2(*b*) is composed of four element scenes E3B1, E3B2, E3B3, and E3B4. This structure is defined by the PC configuration information about the PC data in the component (component specified by C data B) for C scene 3B.

Each element scene has any of data formats such as a single value, a one-dimensional array, and a two-dimensional array. For example, one element scene E3B1 or E3B4 is composed of a single parameter value having data size 1. Element scene E3B2 is composed of a one-dimensional array having eight elements. The data size per element is 16 (element E3B2[1] composed of E3B2[1]1 through E3B2[1]16). Element scene E3B3 has the data format of two-dimensional array. The data format (including the number of array elements) for each element scene and the data size per element are specified by the PC configuration information about the corresponding PC data and the variation information Vari stored as the miscellaneous data for the corresponding C data. The variation information Vari concerns the element scene's data structure for the following reason. When an automixer has one component, for example, there are several variations in terms of the number of inputs and outputs. The variation determines the element scene's data format (including the number of array elements) and the data size per element. Namely, the variation information Vari is a kind of attribute information indicative of a data structure of the operation data set. A plurality of operation data sets held in an operation data set storage may have different data structures. The attribute information is associated with and depends on the corresponding mixer configuration data.

The following summarizes the data structure of the parameter data set in the preset.

(1) The number of C data and its list order in the PC-based CAD data determine the number of C scenes and its list order.

(2) The data structure of the element scene for each C scene includes the order of elements, the data format (including the number of array elements) for each element scene, and the data size per element. The data structure is determined by the PC configuration information about the corresponding PC data and the variation information Vari stored as the miscellaneous data for the corresponding C data.

The header pointing the preset is composed of information indicating the number of components contained in the preset and C headers each providing header information about the components. For example, the PC-based CAD data for CF data 2 in FIG. 2(*b*) is composed of four C data A through D. Therefore, the header pointing the preset 3 is also composed of four C headers 3A through 3D corresponding to the components. The order in a list of C headers corresponds to the order in a list of C data for the PC-based CAD data (i.e., equivalent to the order of C scenes for the parameter data set in the preset). One C header includes a component ID (C_ID), a component version (C_Ver), a unique ID (U_ID), the number of elements, and the data size and the array information for each element scene. C_ID, C_Ver, and U_ID in the C header are the same as C_ID, C_Ver, and U_ID contained in the corresponding C data. The number of elements indicates that in the component specified by the corresponding C data. The data size and the array information for each element scene respectively represent the data size per element for each element scene in the component and the data format (including the number of arrays) of the element scene.

For example, the component of C scene 3B is composed of four elements. Accordingly, the corresponding C header 3B contains the "number of elements" set to "4". The first element scene E3B1 is composed of a single parameter value having data size 1. Accordingly, C header 3B contains the data size set to "1" and the array information set to (1,1) for the first element scene. The array information (1,1) indicates that the data format is a single value. The second element scene E3B2 is a one-dimensional array that has the data size 16 per element and is composed of eight elements. Accordingly, C header 3B contains the data size set to "16" and the array information set to (8,1) for the second element scene. The array information (8,1) indicates that the data format is a one-dimensional array and the number of elements is 8. The third element scene E3B3 is a two-dimensional array composed of eight rows and two columns. C header 3B contains the array information set to (8,2) for the third element scene.

Basically, the above-mentioned methods (1) and (2) are used to determine data structures of parameter data sets in the preset. Since each preset has the above-mentioned header, reference to the header eliminates the need for the procedure in (2) as mentioned above. Therefore, it is possible to obtain the data structure of the parameter data set in the preset without reference to the PC configuration information about the PC data or the variation information Vari in the C data.

The following describes the scene memory. The scene memory stores any number (Ns) of scenes 1 through Ns. Numbers 1 through Ns are called scene numbers. The scene number can be used to specify an area to store the corresponding scene or the scene stored in that area. One scene has a configuration number and a preset number. A user can specify the scene number to recall the scene (referred to as scene recalling). When the scene is recalled, the current pointer is set so that the current configuration becomes equivalent to the CF data having the configuration number assigned to the scene. The CF data is displayed on the mixer configuration screen (FIG. 4(*a*)) to be described later. The preset having the preset number assigned to the scene is read and is set to the current scene (to be described with reference to FIG. 2(*c*)). Reversely, the user can specify the scene number to save the current configuration and the current scene in the scene memory (referred to as scene storing).

FIG. 2(*c*) shows the structure of miscellaneous data in the RAM to be processed by the mixer control program 131 on the PC 130. A current scene represents a parameter data set defined in the mixer configuration for the current configuration, i.e., a current parameter value (current value) of each component for the current configuration. The current scene's access routine is a method that provides the function to access the current scene. Modules included in the mixer control program 131 use this access routine to access the current scene. As already described in relation to the preset, the current scene's data structure depends on the contents of the PC-based CAD data in the current configuration. When the PC-based CAD data is changed (e.g., adding a new component or deleting an existing component), the current scene's data structure also needs to be changed. For this purpose, the RAM of the PC 130 is used to dynamically allocate a storage area for maintaining the current scene. When a change is made to the PC-based CAD data in the current configuration, an area is newly made available for the current scene having the data structure suited for the structure of the PC-based CAD data. Further, an access routine is made available for the current scene. Data for the previous current scene is copied to the new current scene.

An engine-based CAD data generation buffer in FIG. 2(*c*) is used to generate engine-based CAD data from the PC-based CAD data when the CF data is compiled.

Figure 3A:
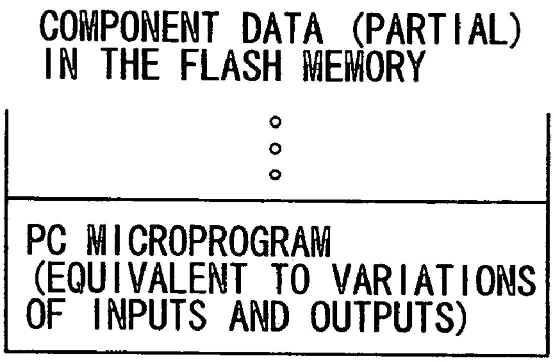
FIGS. 3(*a*) through 3(*c*) are a configuration diagram showing various data in an engine.
Figure 3B:
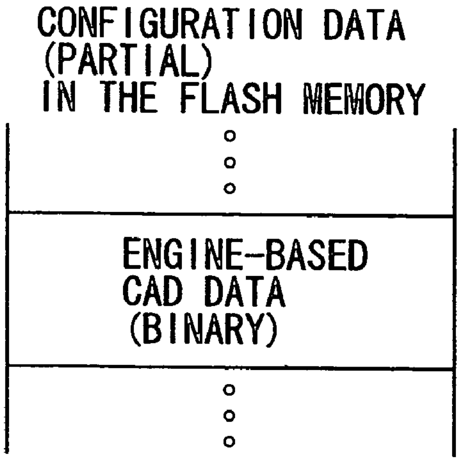
Figure 3C:
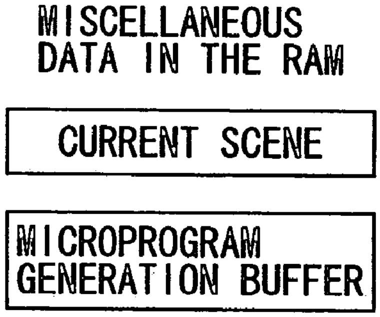

FIG. 3(*a*) partially shows the configuration of component data (PC data) pre-stored in the flash memory 102 of the mixer engine 100. The PC data for the mixer engine has almost the same configuration as that of the PC data for the PC as shown in FIG. 2(*a*). The description in FIG. 2(*a*) can be applied as is. FIG. 3(*a*) shows only a difference. That is, the engine 100 replaces the display and edit process routine in FIG. 2(*a*) with a PC microprogram in FIG. 3(*a*). The engine 100 cannot display a mixer configuration screen or a control screen and therefore does not need the display and edit process routine for the display and editing. Instead, the engine 100 needs to create a microprogram in accordance with the mixer configuration of the engine-based CAD data and supply the microprogram to the DSP group. Accordingly, the engine 100 requires the PC microprogram compliant with the components as shown in FIG. 3(*a*). There are provided all PC microprograms used for variations of the number of inputs and outputs specified by the variation information Vari. Although not shown, PC process routines signify various programs to process respective arrangement information in the engine.

FIG. 3(*b*) partially shows configuration data in the flash memory 102 of the engine 100. The configuration data has almost the same configuration as that of the configuration data in the PC as shown in FIG. 2(*b*). The description in FIG. 2(*a*) can be applied as is. FIG. 3(*b*) shows only a difference. That is, the engine 100 replaces the PC-based CAD data in FIG. 2(*b*) with engine-based CAD data in FIG. 3(*b*). Like the PC-based CAD data, the engine-based CAD data also represents the mixer configuration displayed on the mixer configuration screen. However, since the engine requires no data for display and needs to decrease the amount of data, the engine-based CAD data is represented in binary without containing display data. The engine-based CAD data is generated by compilation in the engine-based CAD data generation buffer in FIG. 2 (*c*). The engine 100 also has the current pointer. The CF data pointed by the current pointer is assumed to be "current configuration".

FIG. 3(*c*) shows miscellaneous data in the RAM 103 of the engine 100. A current scene is used for the engine and provides a parameter data set defined for the current configuration's mixer configuration. The current scene provides data similar to that of the current scene for the PC as shown in FIG. 2 (*c*). The description of the current scene in FIG. 2(*c*) can be applied to the current scene for the engine in FIG. 3(*c*). Although not shown in FIG. 3(*c*), an access routine is also made available. A microprogram generation buffer is used to generate a microprogram corresponding to the mixer configuration. Changing the current pointer loads a microprogram into the microprogram generation buffer. This microprogram implements the mixer configuration for the engine-based CAD data corresponding to the CF data that has become the current configuration anew. The loaded microprogram is then transferred to the signal processing section 110. In this manner, the DSP group in the signal processing section 110 implements operations of the mixer configuration of CAD data for the current configuration. When the current scene is read anew, or when the current scene is changed, the current scene is automatically transferred to the signal processing section 110. The signal processing section 110 loads the transferred current scene into the coefficient memory for the DSP group. The DSP group in the signal processing section 110 uses coefficients in the coefficient memory to execute the transferred microprogram. Consequently, the signal processing section 110 implements operations according to the mixer configuration of engine-based CAD data for the current configuration and according to the parameter data set for the current scene.

As described in relation to FIG. 3(*b*), an optional method is used to store configuration data in the flash memory 102 of the engine 100. Normally, the PC 130 performs this in the online mode. Enabling the online mode for the PC 130 compiles each CF data for the configuration data in the RAM as shown in FIG. 2(*b*). The compiled CF data is transferred to the engine 100. (Compiling the CAD data transfers engine-based CAD data generated in the engine-based CAD data generation buffer.) The contents of the scene memory are also transferred to the engine 100. The engine 100 stores the transferred CF data and scene memory contents in the flash memory 102 as shown in FIG. 3(*b*). This ensures the same configuration data in the PC 130 and the engine 100. Further, in the online mode, the current scene for the PC 136 in FIG. 2(*c*) is transferred and is stored in the current scene for the engine 100 in FIG. 3(*c*). The associated access routine is made available. As mentioned above, the online mode completely synchronizes the PC 130 with the engine 100. A change in the current scene for the PC 130 is reflected on the current scene for the engine 100.

Since the flash memory 102 is nonvolatile, the stored configuration data remains available even after the engine is turned off. Once the configuration data is stored in the flash memory 102, the engine 100 can alone perform the following without connection to the PC 130. For example, the engine 100 can recall a scene by specifying its scene number (making it possible to change the current mixer configuration (CF data)). Further, the engine 100 can change parameter values for the current scene. Moreover, the engine 100 can save the current mixer configuration and the current scene by specifying any scene number.

The following describes screen examples when the mixer control program 131 operates in the system according to the embodiment as described with reference to FIGS. 1 through 3.

Figure 4A:
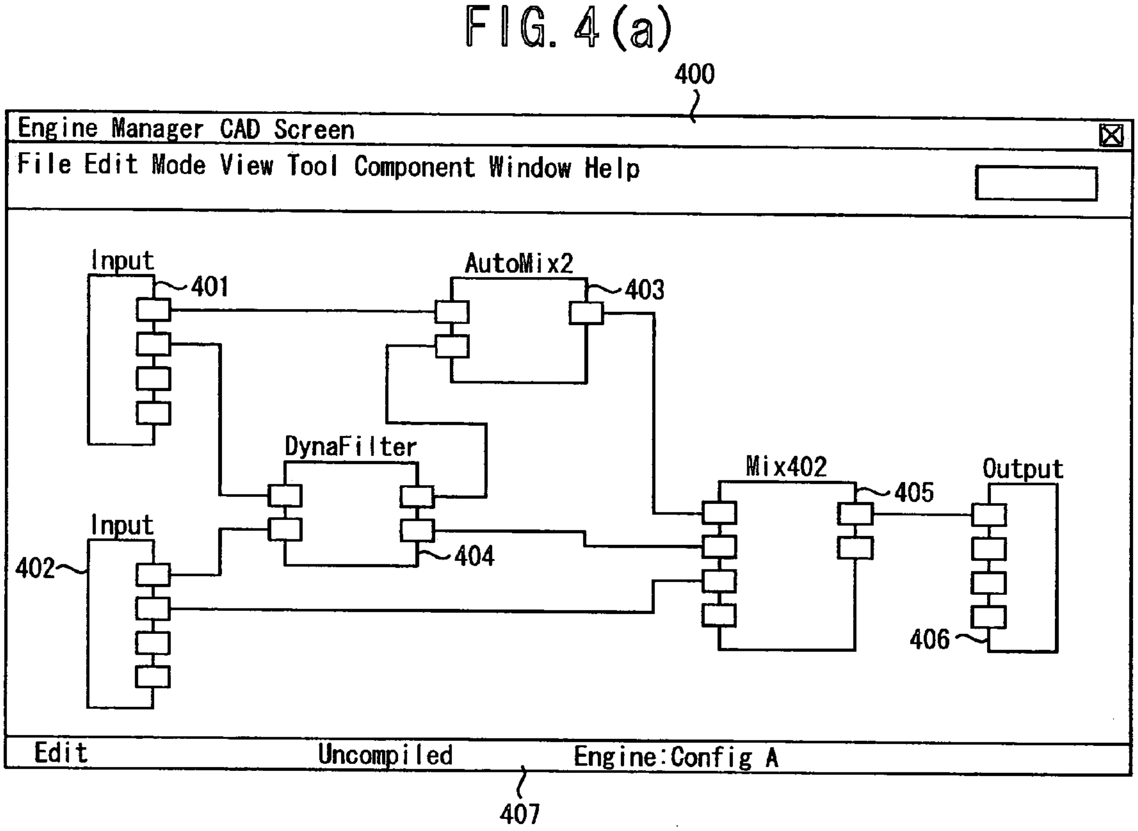
FIGS. 4(*a*) and 4(*b*) are a diagram exemplifying the mixer configuration screen and the control screen.
Figure 4B:
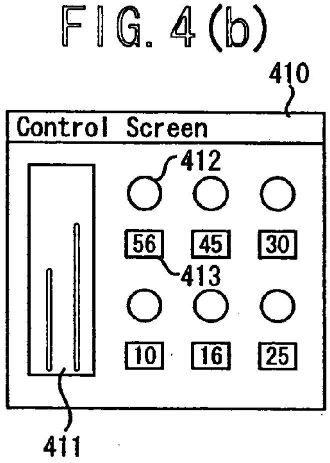

FIG. 4(*a*) exemplifies an edit screen (CAD screen) for the mixer configuration (the current configuration's CF data pointed by the current pointer). In a mixer configuration screen 400, components as constituent elements are arranged based on the CF data in the current configuration. The components are connected with each other through wire connections that specify the input/output relation. Reference numerals 401 and 402 denote elements representing terminals for input to the mixer configuration. Reference numeral 406 denotes an element representing a terminal for output from the mixer configuration. Reference numerals 403 through 404 denote components. These components are specified by C data (FIG. 2(*b*)) of the PC-based CAD data for the current configuration's CF data. The components respectively correspond to PC data in FIG. 2(*a*).

A user can edit the configuration data as follows by performing specified operations (selecting menus or right-clicking) on the mixer configuration screen.

The user can open a file for the specified configuration data. As indicated by reference numeral 210 in FIG. 2(*b*), the opened configuration data is loaded into the RAM. The user can save the configuration data loaded into the RAM by specifying any file name. By recalling a scene, for example, the user can change the current configuration for the configuration data loaded into the RAM. In this case, the mixer configuration screen changes to display the mixer configuration for the CF data corresponding to the new current configuration.

Using the mixer configuration screen, the user can recall various types of components, arrange them, and make wire connections between them. Components that can be recalled are those for PC data stored in the storage apparatus for the PC 130 as shown in FIG. 2(*a*). The user can delete components and disconnect or change wire connections on the mixer configuration screen. These operations are reflected on the CF data for the current configuration. Newly created CF data is provided with new CF_ID. Existing CF data may or may not be edited and can be written as another CF data with a different configuration number. In this case, CF_ID is unchanged and CF_Ver is incremented.

The user can specify compilation of CF data for the current configuration displayed on the mixer configuration screen. Reference numeral 407 denotes a message indicating that the mixer configuration is not compiled. When the compilation is performed, the message 407 changes to Compiled. Using the mixer configuration screen, the user can switch between the online mode and the offline mode.

FIG. 4(*b*) exemplifies the control screen for components. A control screen 410 is displayed by double-clicking any component in the mixer configuration screen 400 in FIG. 4(*a*) or selecting "Open control screen" by means of right-clicking. The control screen 410 for components has an operation device 412 and display elements 411 and 413. The operation device 412 is used to set or change various parameter values for the component. The display elements 411 and 413 are used for a meter and a graph to display the current parameter values. Operating the operation device (dial control) 412 can change the parameter value. A change of the parameter value on the control screen is reflected on the current scene in FIG. 2(*c*). In the online mode, this change is also reflected on the current scene for the engine 100 in FIG. 3(*c*).

Using the mixer configuration screen in FIG. 4(*a*), the user can specify a scene number to recall or store the scene. Recalling the scene enables the CF data having the configuration number for the scene to be the current configuration and displays the associated mixer configuration screen. Recalling the scene reads the preset having the preset number for the scene and sets the preset to the current scene. According to the embodiment, recalling the scene changes the current configuration. The user cannot directly specify CF data using the configuration number to set the CF data to the current configuration. However, it may be preferable to permit the user to use a function of changing CF data for the current configuration by specifying configuration numbers. In this case, each CF data is provided with a backup area for the current scene. When the current configuration is changed from the first CF data to the second CF data, for example, the current scene before the change is saved in the backup area corresponding to the first CF data. Data in the backup area corresponding to the second CF data is read into the current scene.

The following describes operations of the mixer control program 131 according to the embodiment.

Figure 5A:
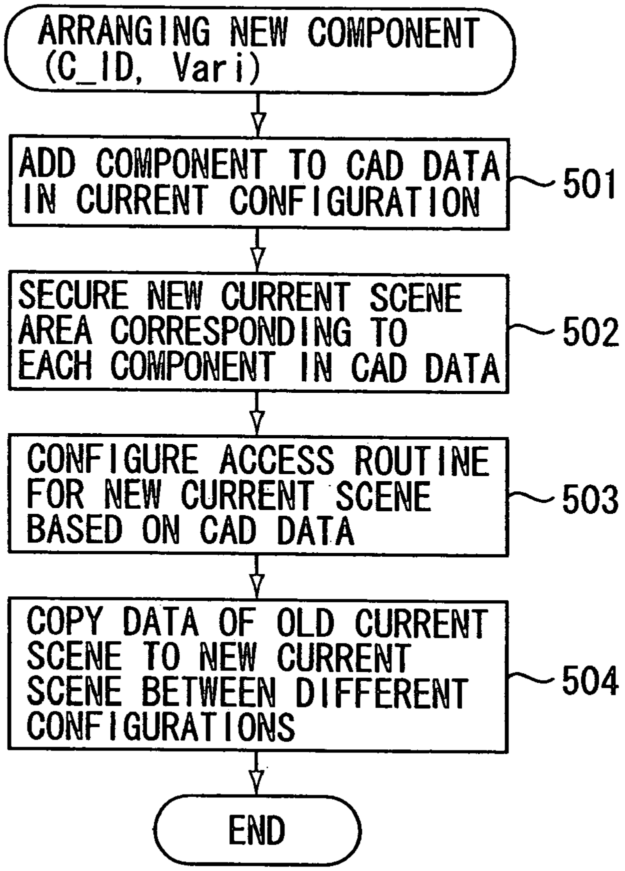
Figure 5B:
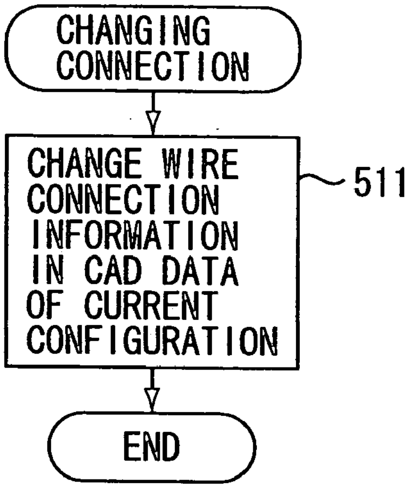
Figure 5C:
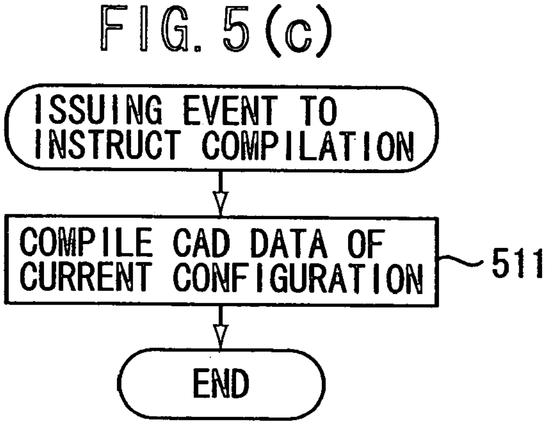

FIG. 5(*a*) shows process flows corresponding to specified operations for recalling a new component and arranging it on the mixer configuration screen as shown in FIG. 4 (*a*). The recalled component is specified by C_ID. To be precise, the component is specified by C_ID and C_Ver. However, it is assumed that one PC 130 has the same C_ID and does not have PC data with a different version (C_Ver). Accordingly, it is assumed that only C_ID can be used to specify a component. When the component is recalled, it is assumed to also specify the variation information Vari such as the number of input or output channels. Obviously, the variation information Vari need not be specified for a component that does not require Vari to be specified.

At step 501, the process adds C data specifying the recalled component to the PC-based CAD data in the current configuration. When the variation information Vari is specified for providing U_ID anew, it is also included in the C data. At step 502, the process ensures an area for the new current scene corresponding to each component of the PC-based CAD data. At step 503, the process configures the access routine for the new current scene based on the PC-based CAD data. As mentioned above, the current scene's data structure depends on the PC-based CAD data in the current configuration. The access routine is made available at step 503 so that each program module can access the current scene without needing to be aware of the data structure. At step 504, the process copies data for the old current scene to the new current scene between different configurations. The PC-based CAD data has different data structures before and after a new component is added. Data is copied from the old current scene to the new current scene between different configurations. The copy between different configurations will be described later.

While there has been described the example of recalling a new component, the similar procedure may be used to delete a component.

FIG. 5(*b*) shows a process flow corresponding to specified operations for editing wire connections on the mixer configuration screen. At step 511, the process changes wire connection data in the PC-based CAD data for the current configuration based on the operation instruction to change the wire connection.

When CAD data is edited (e.g., FIG. 5(*a*) or 5(*b*)) on the PC 130 in the online mode, the contents of the CAD data on the PC 130 become asynchronous with those of the CAD data on the engine 100. Consequently, the offline mode is automatically enabled.

FIG. 5(*c*) shows a process flow when a compilation instruction is issued from the mixer configuration screen. At step 521, the process compiles the PC-based CAD data for the current configuration. The compilation generates engine-based CAD data corresponding to the PC-based CAD data for the current configuration in the engine-based CAD data generation buffer as shown in FIG. 2(*c*). The compilation is performed to check an error in the PC-based CAD data created on the mixer configuration screen. When an error is detected, an error message is displayed and is notified to the user. The process does not use the engine-based CAD data generated from the compilation in the engine-based CAD data generation buffer. An online mode process to be described in FIG. 6(*a*) transfers the engine-based CAD data generated by the compilation to the engine 100. To be more secure, step 521 may be followed by a process similar to that at steps 502 through 504.

Figure 6A:
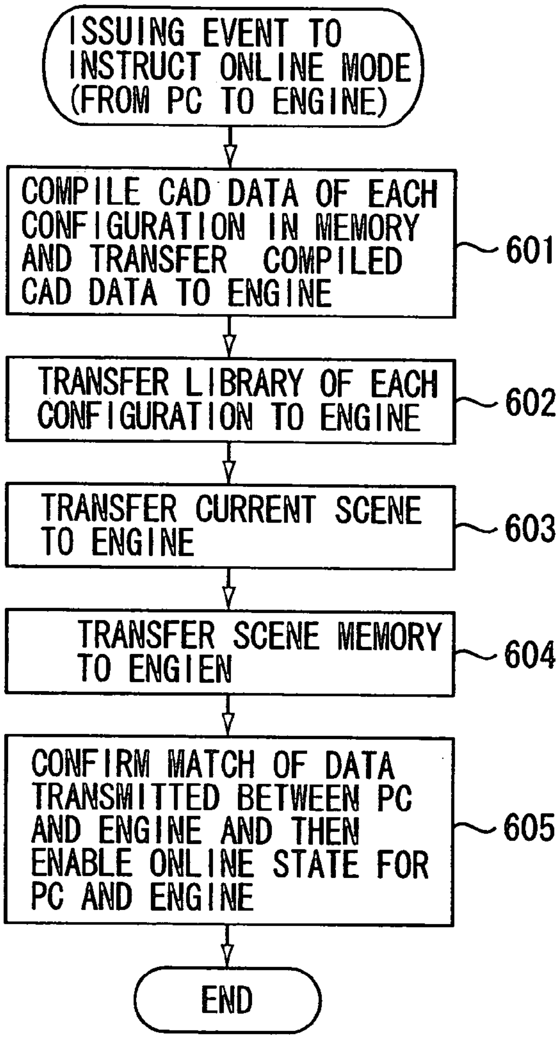
FIGS. 6(*a*) through 6(*c*) are flowcharts showing processes of issuing an event to enable the online mode.
Figure 6B:
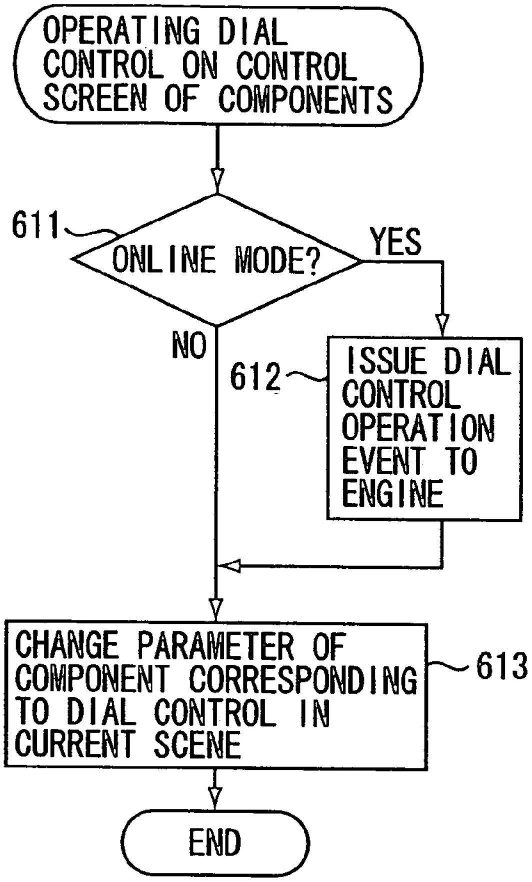
Figure 6C:
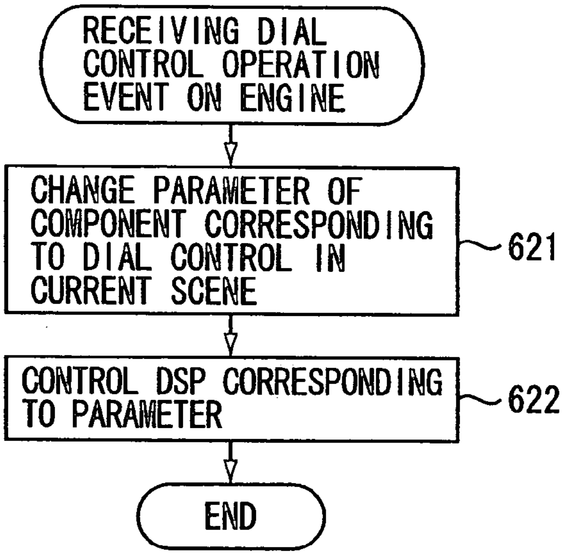

FIG. 6(*a*) shows a process flow when the online mode is specified on the mixer configuration screen. At step 601, the process sequentially compiles all PC-based CAD data for the respective CF data loaded into the RAM as indicated by reference numeral 210 in FIG. 2 (*b*). The compiled PC-based CAD data is transferred to the mixer engine 100. At step 602, the process transfers a library of each CF data (configuration) to the engine. At step 603, the process transfers the current scene (if needed, converted into the data format interpretable for the engine, 100) to the engine 100. At step 604, the process transfers the scene memory in the configuration data 210 to the engine 100. At step 605, the process confirms a match between data transferred to the PC 130 and the engine 100. When a match is confirmed, the process changes the PC 130 and the mixer engine 100 to the online. When the compiled data is transferred at steps 601, 602, and 604, the engine 100 stores this data as the configuration data (FIG. 3(*b*)) in the flash memory 102. The engine 100 loads the current scene transferred at step 603 into the RAM 103 (FIG. 3(*c*)) to make the access routine available.

FIG. 6(*b*) shows a process flow when a dial control operation is performed on the control screen for components as described with reference to FIG. 4 (*b*). When the online mode currently takes effect at step 611, the process transmits a dial control operation event corresponding to the dial control operation to the mixer engine 100 at step 612. At step 613, the process changes the parameter value corresponding to the dial control of the components in the current scene. The similar process may be performed when the other operation devices are operated on the control screen.

FIG. 6(*c*) shows a process on the mixer engine 100 that receives the dial control operation event transmitted at step 612. At step 621, the process changes the parameter value corresponding to the dial control of the components in the current scene for the engine. At step 622, the process transmits the parameter to the DSP 110 so that the DSP 110 operates in accordance with the parameter. The similar process is applied to operation events of the other operation devices.

Figure 7A:
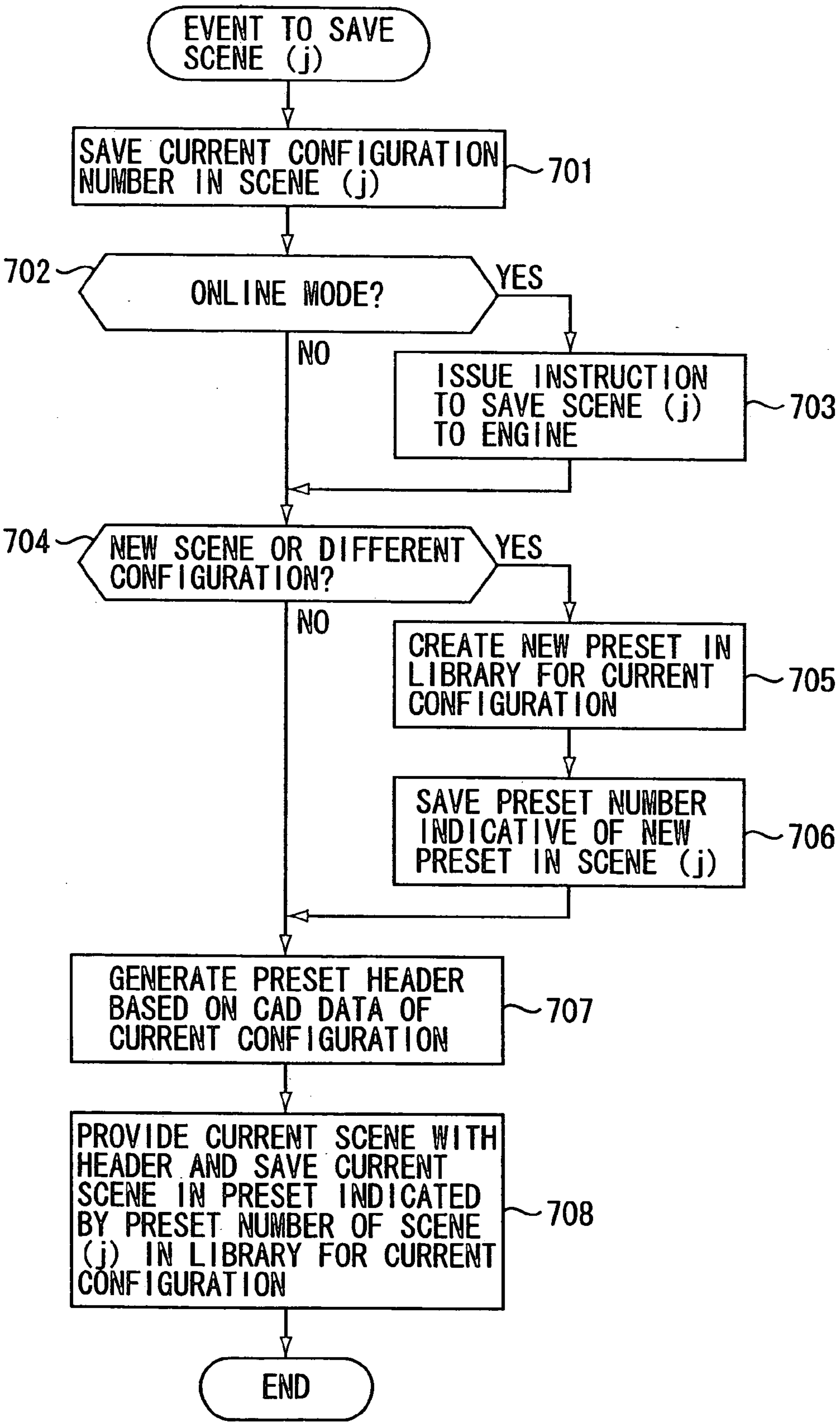
FIGS. 7(*a*) and 7(*b*) are flowcharts showing processes of recalling and storing a scene.
Figure 7B:
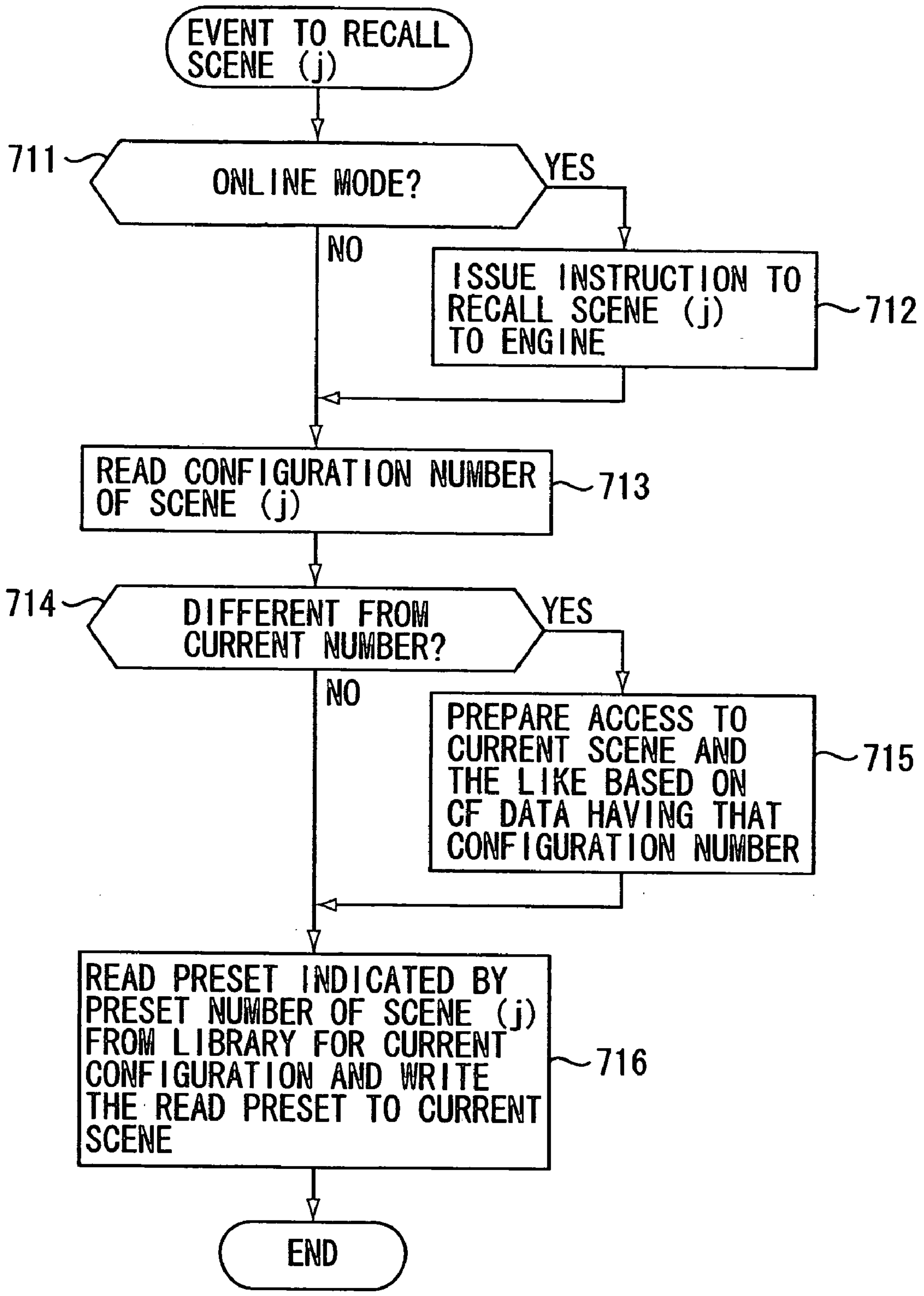

FIG. 7(*a*) shows a process when an instruction to store the scene is issued on the mixer configuration screen as shown in FIG. 4(*a*). Storing a scene signifies saving the current scene as one scene in the scene memory. The current scene is composed of the mixer configuration (current configuration) on the current mixer configuration screen and a group of preset parameters. This example assumes issuance of a save instruction at scene j (an area with scene number j in the scene memory).

At step 701, the process saves the current configuration's configuration number at scene j. For use at step 704 later on, the process backs up a state indicating whether or not scene j before execution of step 701 stores a configuration number. When a configuration number is stored, it is backed up. When the online mode currently takes effect at step 702, the process transmits an instruction to save scene j to the engine 100 at step 703. In this manner, the engine 100 also stores a scene similarly to this process. In this manner, the engine 100 also stores a scene similarly to this process. At step 704, the process determines whether the specified instruction to store the scene is equivalent to saving a new scene or saving scenes between different configurations. "Saving a new scene" signifies a case where nothing is saved in the area for scene j as the save destination before performing step 701. "Saving scenes between different configurations" signifies a case where scene data is already saved in the area for the scene j as the save destination before performing step 701 and the configuration number saved there differs from the configuration number written at step 701. When the determination at step 704 results in YES, the process creates an area for the new preset in the library for the current configuration at step 705. The process saves a preset number indicating the new preset in scene j at step 706. When the determination at step 704 results in NO, the process proceeds to step 707 without making any change to the preset number already saved in scene j (overwriting the preset). This is because the configuration number already saved for the scene equals the configuration number written at step 701.

At step 707, the process generates a preset header based on the PC-based CAD data for the current configuration. At this time, the number of components in the header is configured to be the number of C data in the PC-based CAD data. A list of C headers in the header is determined in accordance with the order of data in the PC-based CAD data. C_ID, C_Ver, and U_ID for each C header are configured to be the same as those included in the corresponding C data. The process determines the number of elements, the data size of each element scene, and the array information from the variation information Vari in the corresponding C data. At step 708, the process provides the current scene with the header and saves the current scene in the preset indicated by the preset number of scene j in the library for the current configuration.

FIG. 7(*b*) shows a process when a scene is recalled on the mixer configuration screen as shown in FIG. 4(*a*). It is assumed here that a recall instruction is issued from scene j.

When the online mode takes effect at step 711, the process transmits an instruction to recall scene j to the engine 100. In this manner, the engine 100 also recalls a scene similarly to this process. At step 713, the process reads the configuration number for scene j. At next step 714, the process determines whether or not the read configuration number differs from the configuration number for the current configuration. When the configuration numbers differ, the process changes the current pointer at step 715 so that the CF data corresponding to the read configuration number becomes the current configuration (the mixer configuration screen also changed). The process prepares an area for a new current scene having the data structure suited for the current configuration's PC-based CAD data to make available the access routine for the current scene. When the configuration numbers are equal to each other at step 714, the process proceeds to step 716 because it just needs to change only the current scene without changing the current pointer. At step 716, the process reads the preset indicated by the preset number of scene j from the library for the current configuration and writes the read preset to the current scene. This process allows the data structure of the preset as a read origin to reference and specify the header. The current scene as a write destination is allowed to use the access routine suited for the data structure. Accordingly, the operation data set for the preset can be assigned to the current scene by converting the data structure indicated by the header information into the data structure corresponding to the CAD data for the current configuration.

Figure 8:
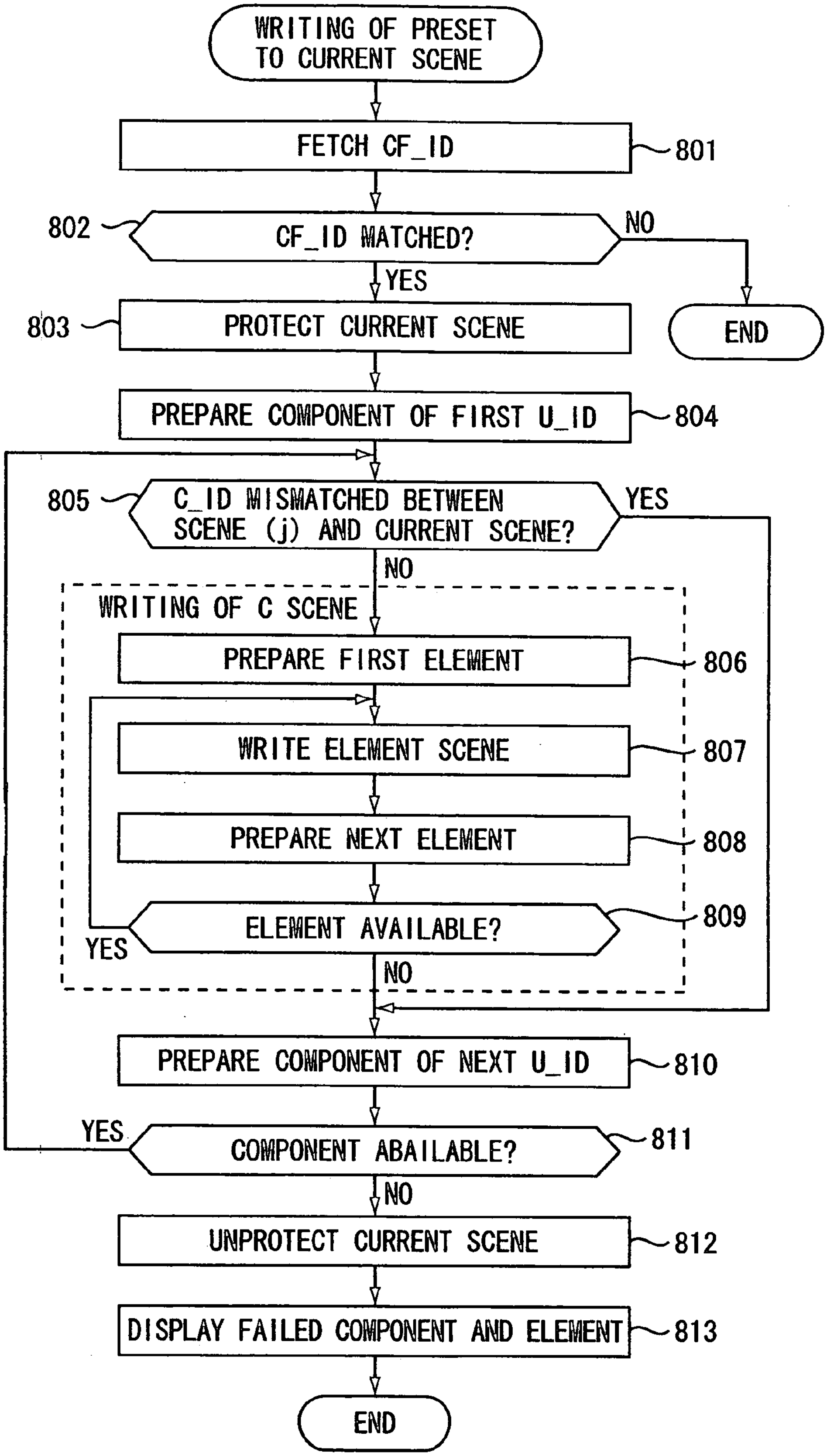
FIG. 8 is a flowchart showing a process of writing to the current scene.
Figure 9A:
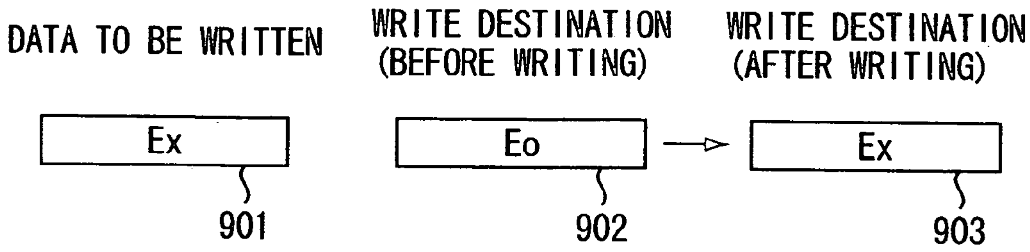
FIGS. 9(*a*) through 9(*e*) are diagrams showing examples of writing element scenes.
Figure 9B:
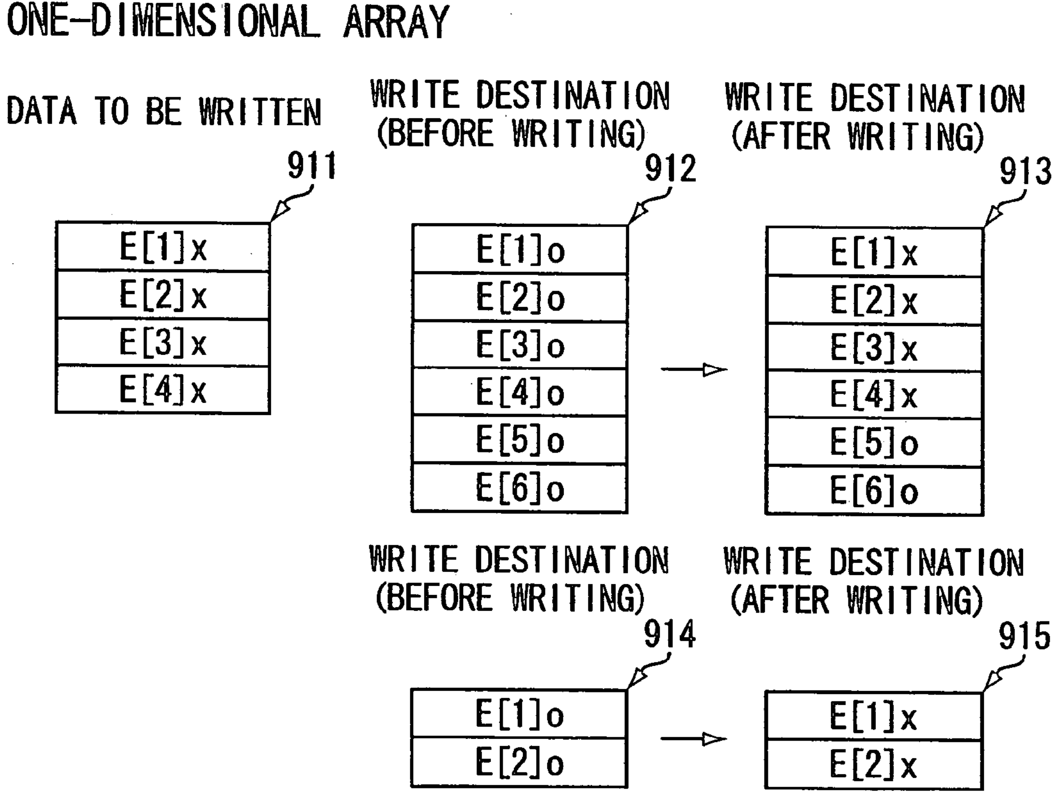
Figure 9D:
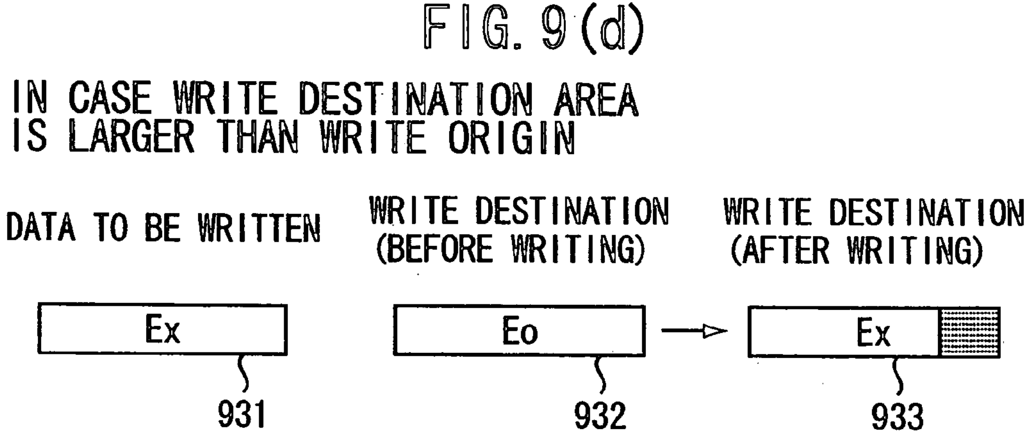
Figures 9C, 9E:
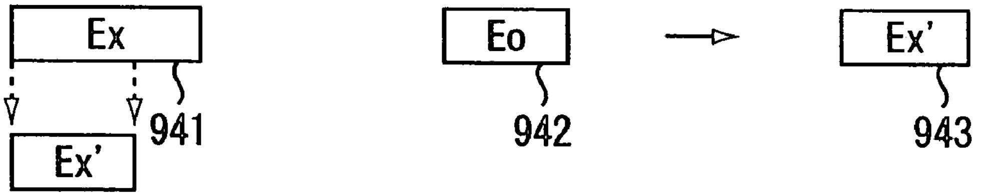

FIG. 8 shows process of writing to the current scene at step 716. It is assumed that there are available the current configuration's configuration number and the preset number to be read. At step 801, the process fetches the current configuration's CF_ID. At step 802, the process compares the fetched CF_ID with CF_ID corresponding to the current scene as a write destination. The current scene stores the parameter data set for the current configuration. Therefore, CF_ID corresponding to the current scene is the very CF_ID for the current configuration. At step 802, the process is sure to proceed to YES. Step 802 is meaningful when the process in FIG. 8 is generalized. This will be described later.

At step 803, the process protects the current scene so as not to be written from the other processes. At step 804, the process prepares a component for the first U_ID. The process references the header of the preset as a read origin to find a C scene with U_ID=1. The process finds a component with U_ID=1 from the PC-based CAD data for the CF data (current configuration) corresponding to the current scene as a write destination. In this manner, the process finds a C scene corresponding to the component in the current scene. As will be understood from the description about U_ID in FIG. 2(*b*), the components having the matching U_ID correspond to each other between two configurations having the matching CF_ID. Accordingly, the process sequentially copies a C scene between the corresponding components while incrementing the U_ID.

At step 805, the process compares the C_ID (obtained from the corresponding C header) for the C scene prepared by the preset as the read origin with the C_ID (obtained from the C data of the PC-based CAD data) for the C scene in the current scene as the write destination. When both C_IDs match, the process, at steps 806 through 809, reads and writes parameter data from the C scene prepared by the preset as the read origin to the C scene in the current scene as the write destination. That is, at step 806, the process prepares the first element. At step 807, the process reads and writes the element scene. At step 808, the process prepares the next element. When there is an element, the process returns to step 807 from step 809. When the copy is complete for all the elements, the process proceeds to step 809.

At step 810, like step 804, the process prepares a component for the next U_ID. When there is a component for the U_ID, the process returns to step 805 to continue. When there is no component, the process unprotects the current scene at step 812. At step 813, the process displays unsuccessfully written components and elements and then terminates.

Generally, at step 807 above, the data structures may not necessarily match between the element scene as the read origin and that as the write destination. Both element scenes have the matching CF_ID, U_ID, and C_ID and therefore are ensured to have the matching data format (single value, one-dimensional array, or two-dimensional array). However, the number of arrays and the data size per element may be changed. It is possible to find the data structure (the number of arrays and the data size per element) of the element scene for the read origin or the write destination as follows. When the element scene is data in the preset, the data structure can be found by reference to the header. When the element scene is the current scene, the data structure can be found from the PC data's PC configuration information or variation information Vari. Accordingly, at step 807, the parameter data set can be copied while converting the data structure. It may be preferable to construct an access routine for the current scene in specific consideration for the number of arrays and the data size per element by referencing the PC configuration information and the variation information Vari. In this manner, the current scene can be accessed without reference to the PC configuration information or the variation information Vari.

While there has been described FIG. 8 as a detailed process at step 716, this process can be generalized to be applied to a data copy between any two parameter data sets. For example, a process similar to that in FIG. 8 can be used to copy parameter data sets between any two presets or between different configurations as described at step 504 in FIG. 5(*a*) and at step 524 in FIG. 5(*c*). When the process is generalized, checking a match between CF_IDs at step 802 is meaningful. When the CF_IDs match, U_ID can be used to identify the corresponding components. Accordingly, a parameter data set can be copied between the corresponding components.

FIG. 9 exemplifies the process to write element scenes at step 807. As mentioned above, when element scenes are written, they have a matching data format but may have different numbers of elements and different data sizes per element. The following are write rules according to these differences.

FIG. 9(*a*) shows a case where the element scene is composed of a single value. Reference numeral 901 denotes data Ex to be written; and 902 denotes data Eo as a write destination. The process to write the element scene changes the write destination data to Ex as indicated by reference numeral 903.

FIG. 9(*b*) shows a case where the element scene has the data format of one-dimensional array. Reference numeral 911 shows element scene data to be written. This data has four elements. When an element scene 912 as a write destination has six elements, the write process overwrites the first to the fourth elements in the element scene as the write destination with write data E[1]x through E[4]x as indicated by reference numeral 913. The existing elements E[5]o and E[6]o remain unchanged. When an element scene 914 as a write destination has two elements, these are changed as indicated by reference numeral 915. The elements E[3]x and E[4]x are ignored.

FIG. 9(*c*) shows a case where the element scene has the data format of two-dimensional array. Element scene data 912 to be written has a format composed of four row elements and three column elements. Element scene 922 as a write destination has six row elements and two column elements. As indicated by reference numeral 923, the write process rewrites only an overlapping portion. The other portion is ignored.

When the element scene is an array as mentioned above, the process rewrites elements whose suffixes match in the write origin and destination. The process ignores elements whose suffixes exist only in the write origin. The process makes no change to elements whose suffixes exist only in the write destination.

FIG. 9(*d*) shows a case where a write destination area is larger than a write origin in terms of the data size per element. A write destination area 932 is larger than write data Ex 931. Data Ex is written to become larger as indicated by reference numeral 933. FIG. 9(*e*) shows a case where a write destination area is smaller than a write origin in terms of the data size per element. A write destination area 942 is smaller than write data Ex 941. Data Ex is written to become smaller as indicated by reference numeral 943.

The engine 100 stores or recalls scenes similarly to the processes as mentioned above with reference to FIGS. 7 through 9.

According to the above-mentioned embodiment, each preset is provided with the header to maintain the information such as C_ID and the data format of each element. Reference only to the header can obtain the data structure of the C scene in the preset without reference to the PC configuration information in the PC data and the variation information Vari in the CF data. When it becomes necessary to change the data structure of the preset in accordance with the change in the PC-based CAD data, the change need not be made immediately. For example, a new component may be added to the CAD data. An existing component may be deleted. A change may be made to the variation information (e.g., the number of inputs or outputs) about the component in the CAD data. In these cases, it is necessary to change the data structure of the associated preset, but not in haste. It just needs to confirm a match of CF_ID between the read origin and the write destination at a timing of necessitating preset data, e.g., reading a preset during the scene recall. A parameter data set may need to be copied between components having the matching U_ID. In this case, the preset's header is used to identify the data structure in the preset. The preset can be reused without reference to the other data.

The header may be provided so as to maintain the information about components included in the corresponding CAD data. For example, the following information may be available.

(Example 1) U_ID, C_ID (Example 2a) U_ID, C_ID, C_Ver (Example 2b) U_ID, C_ID, Data size of each element in the component (Example 3a) U_ID, C_ID, Variation information Vari (Example 3b) U_ID, C_ID, Array information for each element in the component (Example 4a) U_ID, C_ID, C_Ver, Vari (Example 4b) U_ID, C_ID, Data size and array information for each element on the component The above-mentioned embodiment is equivalent to (Example 4b) above. As indicated by (Example 1) above, the header is meaningful when it contains at least U_ID and C_ID. This is because the correspondence between components can be understood.

C_Ver and Vari are provided to enhance the versatility of presets and are not mandatory elements for headers. Even when a component is upgraded, adding C_Ver makes it possible to use the preset for the component before the upgrade by providing the same C_ID. Adding Vari makes it possible to use the same C_ID to manage components that have the same basic arrangement and differ only in scales. Differently scaled components can share the preset between them.

The size and array information about each element can be used instead of C_Ver and Vari. The element size can be used in place of the version by establishing the rule that "changing a component version enables only addition of each element's preset and disables an existing preset from being changed or deleted". The element's array information directly corresponds to the component's scale indicated by Vari.

When the header stores C_Ver or Vari, accessing the preset needs to use its C_Ver or Vari to reference the PC data and obtain the element's size or array information. When the element's size and array is stored, it can be directly used as a parameter during access to the preset.

The preset may be a set of operation data having a specific data structure corresponding to the CAD data. The preset is not necessarily limited to scenes stored in the scene memory. For example, there may be provided a library of preset data for respective mixer engines. In this case, the preset data has the data structure corresponding to CAD data to be used in the respective mixer engines. Further, there may be a library of preset data for custom components. In this case, the preset data has the data structure corresponding to CAD data for the custom components. A custom component is composed of a combination of preset components (those specified by the PC data according to the embodiment) that can be handled as a single component.

What is claimed is:

1. A digital mixer having a sound signal processing module for executing a sound processing operation having a mixer configuration based on a program corresponding to a mixer configuration data defining the mixer configuration, the digital mixer comprising:

a current memory that stores an operation data set having a data structure corresponding to the mixer configuration data;

a control section that controls the sound signal processing operation of the sound signal processing module based on the operation data set stored in the current memory;

an operation data set storage that stores a plurality of operation data sets with attribute information indicative of data structures of the respective operation data sets;

a select section that, in response to a recall operation by a user, selects one of the plurality of operation data sets stored in the operation data set storage; and a convert section that converts the selected operation data set having a data structure indicated by the attribute information of the selected operation data set into an operation data set having the data structure corresponding to the mixer configuration data, based upon the attribute information of the selected operation data set, and writes the converted operation data set into the current memory, wherein the plurality of operation data sets stored in the operation data set storage include a first operation data set having a first data structure and a second operation data set having a second data structure different from the first data structure.

2. The digital mixer according to claim 1, further comprising:

an edit section that, in response to an edit operation by a user, edits the operation data set stored in the current memory; and a write section that, in response to a store operation by a user, writes the operation data set stored in the current memory to the operation data set storage together with attribute information indicative of the data structure corresponding to the mixer configuration data.

3. A digital mixer having a sound signal processing module capable of executing a sound signal processing operation having a mixer configuration based on a mixer configuration data defining the mixer configuration, the digital mixer comprising:

a mixer configuration data storage that stores a plurality of mixer configuration data defining a plurality of mixer configurations;

a first select section that, in response to a first selection operation by a user, selects one of the plurality of mixer configuration data as a current mixer configuration data;

a current memory that stores an operation data set having a data structure corresponding to the mixer configuration defined by the current mixer configuration data;

an operation data set storage that stores a plurality of operation data sets with attribute information indicative of data structures of the respective operation data sets;

a second select section that, in response to a second selection operation by a user, selects one of the plurality of the operation data sets in the operation data set storage;

a convert section that converts the selected operation data set having the data structure indicated by the attribute information of the selected operation data set into an operation data set having a data structure corresponding to the mixer configuration defined by the current mixer configuration data from the data structure indicated by the attribute information of the selected operation data set, and writes the converted operation data set into the current memory;

a first supply section that supplies the sound signal processing module with a program corresponding to the current mixer configuration data, the sound signal processing module executing the sound signal processing operation according to the supplied program; and a second supply section that supplies the sound signal processing module with the operation data set stored in the current memory, the sound signal processing module executing the signal processing operation using coefficients corresponding to the supplied operation data, wherein the plurality of operation data sets stored in the operation data set storage include a first operation data set having a first data structure and a second operation data set having a second data structure different from the first data structure, and wherein the data structure of the operation data in the current memory changes according to which one of the mixer configuration data in the mixer configuration data storage is selected as the current mixer configuration by the first selection section.

4. The digital mixer according to claim 3, further comprising an edit section that edits the selected mixer configuration data in response to an edit operation by the user, wherein, when the selected mixer configuration data is edited by the edit section, the convert section converts the operation data set stored in the current memory into an operation data set having a data structure corresponding to a mixer configuration defined by the edited mixer configuration data.

5. The digital mixer according to claim 4, further comprising a write section that writes the operation data set stored in the current memory into the operate data set storage together with attribute information indicative of the data structure corresponding to the mixer configuration defined by the edited mixer configuration data in response to a store operation by the user.

6. The digital mixer according to claim 3, further comprising:

an edit section that, in response to an edit operation by a user, edits the operation data set stored in the current memory; and a write section that, in response to a store operation by the user, writes the operation data set stored in the current memory into the operation data set storage together with attribute information indicative of the data structure corresponding to the mixer configuration defined by the selected mixer configuration data.

7. A mixer configuration editing apparatus for editing a mixer configuration data used in a digital mixer that has a sound signal processing module for executing a sound signal processing operation having a mixer configuration, said sound signal processing operation using a mixer configuration, the mixer configuration editing apparatus comprising:

a mixer configuration data storage that stores a plurality of mixer configuration data defining a plurality of mixer configurations;

a first select section that, in response to a first selection operation by a user, selects one of the plurality of mixer configuration data in the mixer configuration data storage, said selected mixer configuration data defining a mixer configuration as a current mixer configuration data;

a current memory that stores an operation data set having a data structure corresponding to the current mixer configuration data;

an operation data set storage that stores a plurality of operation data sets with attribute information indicative of the data structures of the respective operation data sets;

a second select section that, in response to a second selection operation by the user, selects one of the plurality of operation data sets in the operation data set storage;

a convert section that converts the selected operation data set having the data structure indicated by the attribute information of the selected operation data set into an operation data set having the data structure corresponding to the mixer configuration defined by the current mixer configuration data, and writes the converted operation data set into the current memory;

a first edit section that, in response to a second edit operation by the user, edits the current mixer configuration data defining the mixer configuration; and a second edit section that, in response to a second edit operation by the user, edits the operation data set stored in the current memory, wherein the plurality of operation data sets stored in the operation data set storage include a first operation data set having a first data structure and a second operation data set having a second data structure different from the first data structure, wherein the data structure of the operation data in the current memory changes according to which one of the mixer configuration data is selected by the first selection section, and wherein the sound signal processing module of the digital mixer executes the sound signal processing operation, having the mixer configuration according to a program corresponding to the current mixer configuration data, and using coefficients corresponding to the operation data stored in the current memory.

8. The mixer configuration editing apparatus according to claim 7, wherein, when the current mixer configuration data is edited by said first editing section, the convert section further converts the operation data set stored in the current memory into a data structure corresponding to a mixer configuration defined by the edited current mixer configuration data.

9. The mixer configuration editing apparatus according to claim 7, further comprising a write section that, in response to a store operation by the user, writes the operation data set stored in the current memory into the operation data set storage together with the attribute information indicative of the data structure corresponding to the mixer configuration defined by the mixer configuration data.

10. The mixer configuration editing apparatus according to claim 7, further comprising an interpret section that interprets the mixer configuration data stored in the mixer configuration data storage and the operation data set stored in the operation data set storage into a format interpretable by the digital mixer, and that transfers the interpretable format of the mixer configuration data and the operation data set to the digital mixer.

11. The mixer configuration editing apparatus according to claim 7, wherein each of the mixer configurations is composed of at least one component for signal processing and connections between the components, wherein each of the mixer configuration data includes a plurality of component IDs identifying the components that make up the mixer configuration, and wire data specifying the connection between the components, wherein the data structure of an operation data set corresponding to the mixer configuration data is composed of data corresponding to the components that make up the mixer configuration defined by the mixer configuration data, and wherein the data structure of each of the operation data sets in the operation data set storage is indicated by the attribute information having the same component IDs as the mixer configuration data corresponding to the operation data set.

12. The mixer configuration editing apparatus according to claim 11, wherein each of the mixer configuration data and each of the attribute information include respective unique IDs that specify correspondence of the components between different mixer configurations, and the convert section identifies correspondence between the data structure of the selected operation data set and the data structure corresponding to the current mixer configuration data based on the unique IDs.

13. The mixer configuration editing apparatus according to claim 7, wherein each of the mixer configuration data includes a configuration ID, and each of the attribute information includes the same configuration ID as the mixer configuration data corresponding to the attribute information, and wherein the convert section operates only if the attribute information of the selected operation data set and the current mixer configuration data have the same configuration ID.

14. The mixer configuration data editing apparatus according to claim 13, wherein the configuration ID of the configuration data remains the same from before to after editing by the first edit section.

15. A machine readable medium containing a control application program executable by a computer to edit a mixer configuration data used for a digital mixer which has a sound signal processing module for a sound signal processing operation having a mixer configuration according to a program, said control application program causes the computer to perform a data editing method comprising:

a mixer configuration data storage step of storing a plurality of mixer configuration data defining a plurality of mixer configurations in a mixer configuration data storage;

a first select step of, in response to a first selection operation by a user, selecting one of the plurality of mixer configuration data in the mixer configuration data storage, the selected mixer configuration data defining a mixer configuration as a current mixer configuration;

a preparation step of preparing, in a current memory, an operation data set having a data structure corresponding to the current mixer configuration data;

an operation data set storage step of storing, into an operation data set storage, a plurality of operation data sets with attribute information indicative of the data structures of the respective operation data sets;

a second select step of selecting, in response to a second selection operation by the user, one of the plurality of the operation data sets in the operation data set storage;

a convert step of converting the selected operation data set having the data structure indicated by the attribute information of the selected operation data set into an operation data set having the data structure corresponding to the mixer configuration defined by the current mixer configuration data, and writing the converted operation data set into the current memory;

a first edit step of, in response to a first edit operation by a user, editing the current mixer configuration data defining the mixer configuration; and a second edit step of, in response to a second edit operation by a user, editing the operation data set stored in the current memory, wherein the plurality of operation data sets stored in the operation data set storage include a first operation data set having a first data structure and a second operation data set having a second data structure different from the first data structure, wherein the data structure of the operation data in the current memory changes according to which one of the mixer configuration data is selected by the first selection section, and wherein the sound signal processing module of the digital mixer executes the sound signal processing operation, having the mixer configuration according to the program corresponding to the current mixer configuration data, and using coefficients corresponding to the operation data stored in the current memory.

16. The machine readable medium according to claim 15, wherein the data editing method further comprises another convert step of converting the operation data set stored in the current memory, when the current mixer configuration data is edited by the first editing step, into an operation data set having a data structure corresponding to a mixer configuration defined by the edited mixer configuration data.

17. The machine readable medium according to claim 15, wherein the data editing method further comprises a write step of, in response to a store operation by the user, writing the operation data set held in the current memory into the operation data set storage together with the attribute information indicative of the data structure corresponding to the mixer configuration defined by the current mixer configuration data.

18. The machine readable medium according to claim 15, wherein the data editing method further comprises an interpret step of interpreting the mixer configuration data stored in the mixer configuration data storage and the operation data set stored in the operation data set storage into a format interpretable by the digital mixer, and transferring the interpretable format of the mixer configuration data and the operation data set to the digital mixer.

* * * * *